(12) United States Patent
Fukuoka et al.

(10) Patent No.: US 7,584,206 B2
(45) Date of Patent: Sep. 1, 2009

(54) FILE RECORDING METHOD AND FILE RECORDING APPARATUS

(75) Inventors: Tomomi Fukuoka, Yokohama (JP); Masahiko Takaku, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 308 days.

(21) Appl. No.: 11/218,236

(22) Filed: Sep. 1, 2005

(65) Prior Publication Data
US 2006/0059190 A1     Mar. 16, 2006

(30) Foreign Application Priority Data
Sep. 1, 2004     (JP) ............................. 2004-254680

(51) Int. Cl.
*G06F 7/00*     (2006.01)

(52) U.S. Cl. ............................. 707/102; 711/3; 711/101
(58) Field of Classification Search .................. 707/102
See application file for complete search history.

(56) References Cited

U.S. PATENT DOCUMENTS

2003/0103073 A1*   6/2003   Yokoyama ................... 345/716
2003/0147462 A1*   8/2003   Maeda ...................... 375/240.1

FOREIGN PATENT DOCUMENTS

JP     2003-173625     6/2003

* cited by examiner

*Primary Examiner*—Pierre M Vital
*Assistant Examiner*—Truong V Vo
(74) *Attorney, Agent, or Firm*—Cowan, Liebowitz & Latman, P.C.

(57) ABSTRACT

A method and apparatus that, when generating a multimedia file in which encoded data management information is placed at the head of the file, estimates the size needed for the management information in advance and generates a file in which an empty space the size of the estimated size is reserved at the head of the file, with the encoded data directly recorded behind the empty space. If the reserved empty space is insufficient, a new file that reserves a larger empty space is generated and the recorded encoded data is copied and the management information that is ultimately generated is inserted in the head of the file, thus shortening contents creation time and moreover reducing storage space for multimedia contents designed for quick reproduction.

12 Claims, 13 Drawing Sheets

FIG. 12 moov ASSUMED SIZE CALCULATION FORMULA (UNIT: BYTE)

mvsize (MAXIMUM SIZE OF OVERALL REQUIRED METADATA)
= SEVERAL HUNDRED (INCLUDING mvhd AND OTHER ADJUSTMENTS) +
  SEVERAL HUNDRED (INCLUDING tkhd AND OTHER ADJUSTMENTS) × t +
  (Fstts + Fstss + Fstsz + Fctts + Fstco) × t

FUNCTION/VARIABLE DETAILS

Fstts = 8n + 16 = 8fx + 16

Fstss = 4n + 12 = 4fx + 12

Fstsz = 4n + 20 = 4fx + 20

Fctts = 8n + 16 = 8fx + 16

Fstco = 4n/c + 16 = 4fx/c + 16

※ t = NUMBER OF TRACKS  n = TOTAL NUMBER OF FRAMES
  c = NUMBER OF CHUNKS  f = FRAME RATE (fps)
  x = LENGTH OF IMAGE PICKUP TIME (sec)

FILE RECORDING METHOD AND FILE RECORDING APPARATUS

FIELD OF THE INVENTION

The present invention relates to a file recording method and file recording apparatus, and more particularly, to a file recording method and a file recording apparatus that outputs in one operation a data structure that includes moving picture data and audio data management information, in an effort to shorten file creation time and use storage space efficiently.

BACKGROUND OF THE INVENTION

Digital equipment such as a digital video recorder, digital camera, PDA or mobile-phone has rapidly come into widespread use in recent years, and digitization of television broadcasting has also proceeded. As a result, it has become possible to handle a wide variety of data, from video and audio to still picture and text, as digital format data ("digital data"). Given this sort of background, there is extensive research on multimedia technology that handles a wide variety of data comprehensively. In addition, within multimedia technology as well, digital data compression technology is very important, and within digital data compression technology, MPEG-4 is a standard for generating moving pictures and reproducing interactive media. MPEG-4 can be applied to generate a large variety of moving pictures having different quality, e.g., from a quality for transmitting via a low-speed line to that of high-definition television picture. The ISO (International Organization for Standardization) is proceeding with work on the standardization of MPEG-4. MPEG-4 data compression technology is not directly relevant to the present invention, and therefore a detailed description thereof is omitted here.

As an MPEG-4-compatible file format for storing contents, there is a so-called MP4 file format specified by ISO/IEC 14496-14. The MP4 file format is composed of metadata, which describes information relating to the media, and media data, which is encoded video and audio data. All the data is contained in a data structure called a "Box" (or "atom").

FIG. 1 is a diagram showing the data structure of a Box. As shown in FIG. 1, a Box 101 is composed of a size field 102, a type field 103 and a data field 104. The size of the entire Box (that is, the number of bytes), including the size field, is contained in the size field 102, and a Box identifier (usually four letters) is stored in the type field 103. Actual header data and media data are stored in the data field 104.

Although the foregoing is the basic data structure of the Box, in addition there may also be a version field (1 byte) and/or a flags field (3 bytes) in front of the data field 104. A Box that has these fields is called a Full Box. The metadata portion that forms the MP4 file format described above using such a Box structure is called a MovieBox (hereinafter "moov"). Similarly, the media data portion is called a MediaDataBox (hereinafter "mdat").

In addition, the MP4 file format Box defined in ISO/IEC 14496-14 consists not only of required boxes but also of optional boxes that maybe used as necessary, or boxes that are freely defined by the user. These include, for example, a FileTypeBox (hereinafter "ftyp"). The ftyp must be at the head of the MP4 file. FIG. 2 shows an example of an MP4 Box structure using ftyp. Although the ftyp 202 must be placed at the head of the file, the remaining Boxes, such as the moov 203 and the mdat 204, maybe placed in any order.

In addition, furthermore, a detailed description of moov and mdat is now given, using FIG. 6. For simplicity, the description begins with an mdat 620. The mdat 620 is composed of a sequence of data units called chunks. In the example shown in FIG. 6, the mdat 620 has a structure in which audio chunks and video chunks are arranged in alternating sequence, that is, Audio chunk 1 (621), Video chunk 1 (622), Audio chunk 2, Video chunk 2, . . . and so forth.

The order of the chunks as well as the number of chunks that form the mdat are arbitrary. In addition, one chunk is composed of a sequence of data units corresponding to 1 frame of video or audio data called a sample. Using the example of a Video chunk 1 (622) shown in FIG. 6, the Video chunk 1 (622) is composed of a sequence of several vide samples, that is, Video sample 1 (623), a Video sample 2 (624), a Video sample 3, . . . and so forth.

Next, a description is given of the structure of the moov 601. The moov 601 is further layered into Boxes, with a required Box in the form of a MovieHeaderBox (mvhd 602) that contains header information as a whole, and a plurality of TrackBoxes such as a trak(Audio) 603 and a trak(Video) 604 used as examples in FIG. 6. These TrackBoxes are further layered into Boxes. A description of the structure of the lower layer is given using trak(Video) 604 as an example.

Descending to the lower layer of the layers in the trak (Video) 604 shown in FIG. 4, it can be seen that there is a SampleTableBox(stbl) 605. Data of at least one of the chunks and the samples of the mdat 620 is contained in this Box, linked to each item. To describe simply the items in the stbl 605, it is to be observed that stts 606 is the duration of the sample, stsd 607 is sample details, stsz 608 is sample size, stsc 609 is the number of samples included in a chunk, that is, the number of frames, and stco 610 is a chunk offset, each linked with the samples and stored.

With such structure and data, it is possible to reproduce an MP4 file while manipulating actual media data of the mdat.

Examining what happens when creating an MP4 file, it can be seen that a variety of information is created that is stored in the moov, such as offset values and the like, while creating the mdat that is actual encoded data. As a result, conventionally, as shown in FIG. 3, when creating an MP4 file from data encoded in an audio/video encoding process 301 with an MP4 file generation process 310, the following method is used: First, in an mdat generation process 311, the mdat is written at the head of the file. Then, from that mdat information, the moov is generated in a moov generation process 312 in a memory or in a temporary file. Finally, in a mdat/moov file generation process 313, the moov generated in the memory of the temporary file is written behind the mdat. This method is thought to minimize the required memory and make rapid file creation possible.

However, what the user values most in contents reproduction is an adequately short waiting time from contents request to the start of contents display. In order to satisfy this requirement, the moov which is the contents metadata must be present at the head of the file, and moreover, its size must not be too large.

Conventionally, when generating an MP4 file in which the moov is at the head of the file and the mdat comes after the moov as described above, a method like that shown in FIG. 4 is employed. In other words, when generating an MP4 file by an MP4 file generation process 410 from the encoded data encoded by the audio/video encoding process 301, first, the mdat is written to a temporary file in the mdat generation process 311. Then, in the moov generation process 312 the moov is generated in a memory or in a temporary file. Finally, in a moov/mdat file generation process 413 a new MP4 file is composed in the order of moov, mdat.

This technique, however, is redundant, because once both the moov and the mdat are generated in the memory or the temporary file, they are then written to the final MP4 file (copied).

In addition, the definition of the move portion sometimes differs between applications depending on the optional Boxes and the user-defined Boxes. In that case, depending on the application, it may be impossible to reproduce a file created on another application. It is possible to solve this problem of compatibility between applications by converting only the moov portion.

A technique for efficiently generating MP4 files beginning with moov and maintaining compatibility between applications has been proposed in for example Japanese Laid-Open Patent Publication No. 2003-173625, involving providing the ability to store vendor candidates that are expected to be used in conversion and their attendant MP4 file format metadata information in the apparatus in advance, and then from that information reserving a metadata size that includes free data and generating an MP4 file.

A description is given of the outlines of the technique proposed in Japanese Laid-Open Patent Publication No. 2003-173625 using FIG. 5. Specifically, when the MP4 file is generated by an MP4 file generation process 510 from the encoded data encoded by the audio/video encoding process 301, first the mdat is created in a memory or in a temporary file in an mdat generation process 511. Then, the moov is generated in the memory or in the temporary file from that mdat information in a moov generation process 512.

Next, the sum of a free space which may be required with the addition of file conversion time to the moov size obtained with the moov generation process 512 in order to maintain compatibility is calculated with a moov+free space calculation process 513. Finally, in a moov+free/mdat file generation process 514, the moov is written in at the head of the MP4 file and the mdat is written in after the moov+free space (a free space is left open after the moov and the mdat written in). Thus is the MP4 file generated.

In the conventional art proposed in Japanese Laid-Open Patent Publication No. 2003-173625, free space is reserved for MP4 file format conversion, making it possible to shorten file conversion processing time and to delete temporary space such as the temporary copies required for conversion processing. However, if file format conversion is not required, the free space remains reserved as is without being used, thus increasing file size unnecessarily and wasting storage device capacity when storing.

Although in the conventional art described above efficient file conversion with little memory is possible, when analyzed in terms of MP4 file storage, in the case of small mobile equipment such as mobile-phones and PDAs (Personal Digital Assistants), the storage capacity is at most several tens to several hundreds of MB, which is quite limited compared to devices such as a personal computer (PC) having a large-scale storage capacity of several tens to over 100 GB. Therefore, particularly in devices with little storage capacity, it is desirable that files be stored efficiently in limited storage space.

In addition, when analyzed in terms of file creation time, in an image pickup apparatus such as a digital video recorder or a digital camera, or a mobile-phone or a PDA equipped with an image pickup function, it can sometimes take a long time to complete the creation of an image pickup or an edited multimedia file. In this type of waiting time (that is, the time required for file creation), as described using FIG. 3 and FIG. 4 of the background art, a delay attendant upon the copying of the data carried out during file creation and the order of processing in file editing is included. Therefore, reducing file creation time so that the user can move quickly to the next action after moving picture pickup is completed is also desirable.

SUMMARY OF THE INVENTION

The present invention has as its object to solve these problems of the conventional art.

According to an aspect of the present invention, there is provided a file generating method for generating a file that contains encoded data and management information that manages the encoded data, comprising: a calculating step of calculating a capacity thought to be required for recording the management information as management information capacity; a file generating step of generating a new file that reserves a space that is equivalent to the management information capacity at the head of the file; an encoded data recording step of recording encoded data after the space that is equivalent to the management information capacity in the new file in a predetermined format; a management information generating step of generating management information based on the encoded data that is recorded; a comparing step of comparing the management information capacity and an actual capacity of the management information that is generated in the management information generating step; and a control step of executing the encoded data recording step, the management information generating step and the comparing step on encoded data targeted for recording.

According to another aspect of the present invention, there is provided a file generating apparatus for generating a file that contains encoded data and management information that manages the encoded data, comprising: calculating means adapted to calculate a capacity thought to be required for recording the management information as management information capacity; file generating means adapted to generate a new file that reserves a space that is equivalent to the management information capacity at the head of the file; encoded data recording means adapted to record encoded data after the space that is equivalent to the management information capacity in the new file in a predetermined format; management information generating means adapted to generate management information based on the encoded data that is recorded; comparing means adapted to compare the management information capacity and an actual capacity of the management information that is generated by the management information generating means; and control means adapted to cause the encoded data recording means, the management information generating means and the comparing means to execute processing of encoded data targeted for recording.

The file generating method and apparatus of the present invention makes it possible to generate swiftly compact multimedia files designed for quick reproduction with limited memory capacity.

Other objects and advantages besides those discussed above shall be apparent to those skilled in the art from the description of preferred embodiments of the invention which follows. In the description, reference is made to the accompanying drawings, which form a part thereof, and which illustrate an example of the various embodiments of the invention. Such examples, however, are not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 12 is a diagram illustrating an example of a method of calculating moov empty space in the first and second embodiments of the present invention.

DETAILED DESCRIPTION OF THE INVENTION

Preferred embodiments of the present invention will now be described in detail in accordance with the accompanying drawings.

FIRST EMBODIMENT

Figure 7:
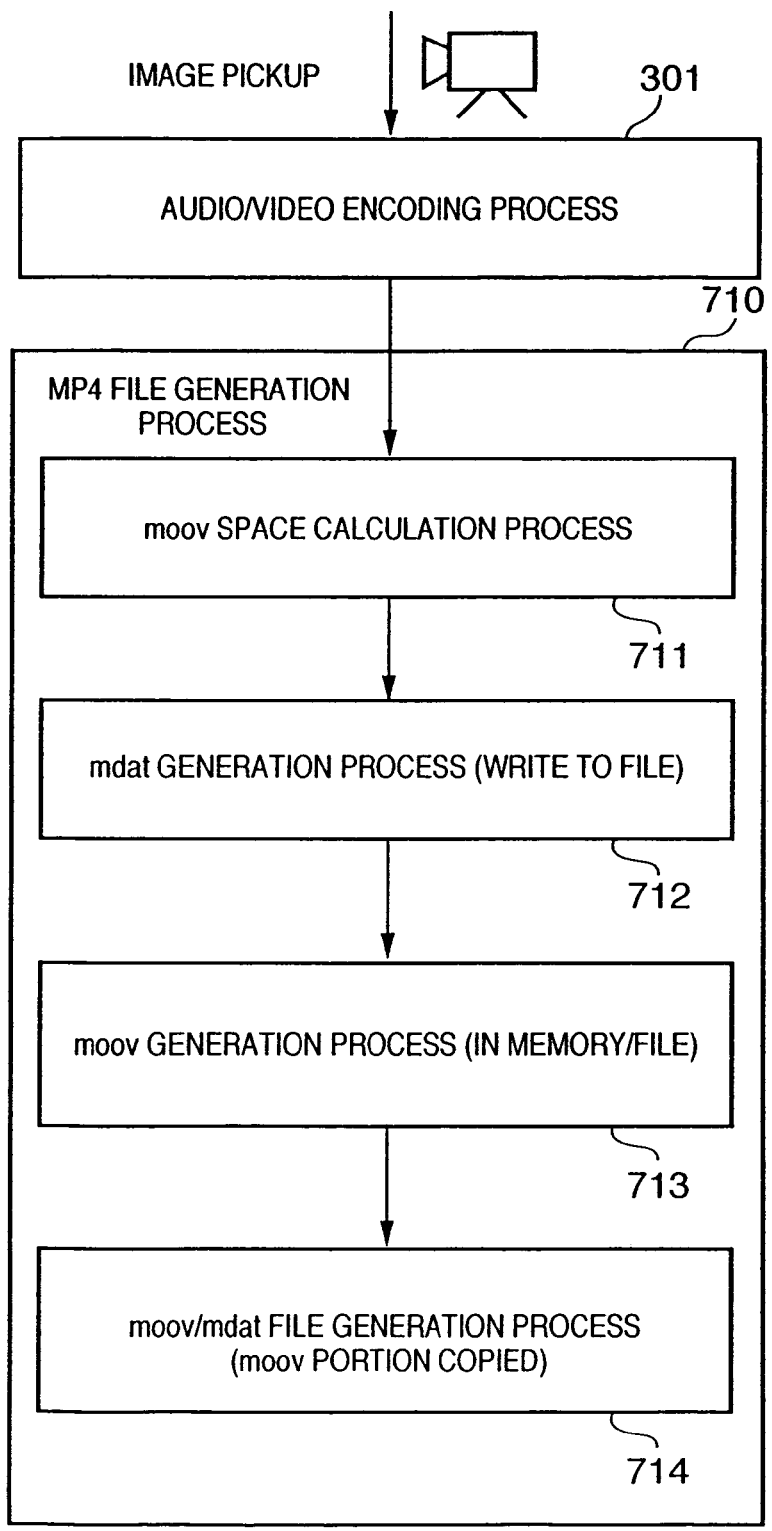
FIG. 7 is a block diagram showing the structure of a process up to the generation of an MP4 file according to a first embodiment of the present invention.

First, a summary description is given of the method of creating an MP4 file in the present embodiment, with reference to FIG. 7. In the MP4 file created in the present embodiment, the Boxes are arranged in the order of moov, mdat. Otherwise, where ftyp is required, the order is ftyp, moov, mdat. Accordingly, all Boxes other than moov, mdat are accommodated as convenient by their respective applications and their respective standards. Here, however, the description of the embodiment concentrates on the main Boxes moov, mdat.

(Summary of the MP4 file Generation Process)

Just before acquiring encoded data that has been encoded by a audio/video encoding process 301, moov portion smaller empty space size is determined in advance by a moov space calculation process 711 of an MP4 file generation process 710 and a new MP4 file is created. Thereafter, by an mdat generation process 712, the mdat is written after the space or the size of the new MP4 file calculated by the moov space calculation process 711. Then, by a moov generation process 713, information to be written into the moov portion from the mdat is generated in a memory or a temporary file. Finally, the final MP4 file is generated by overwriting the actual moov in an empty space reserved in advance for the moov at the head of the MP4 file by a moov/mdat file generation process 714.

Figure 1:
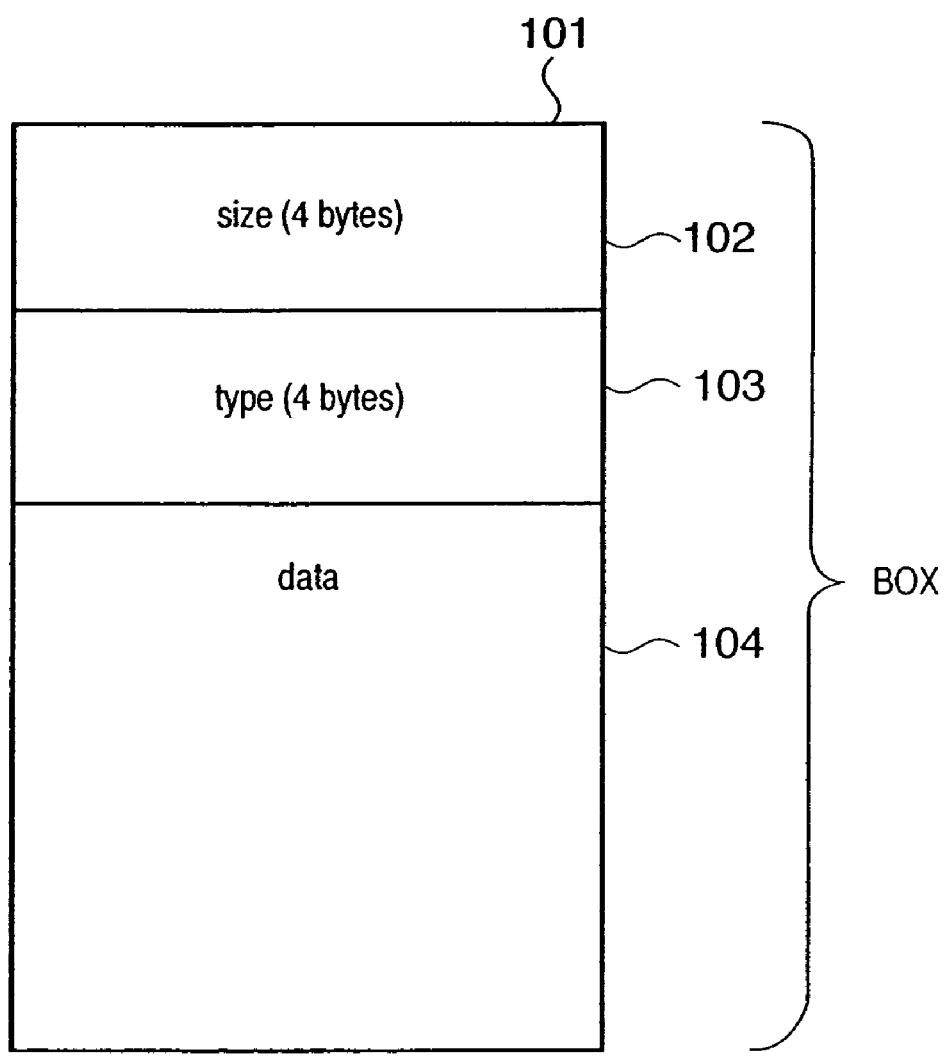
FIG. 1 is a block diagram showing the structure of a Box that is the basic unit of a conventional MP4 file.
Figure 2:
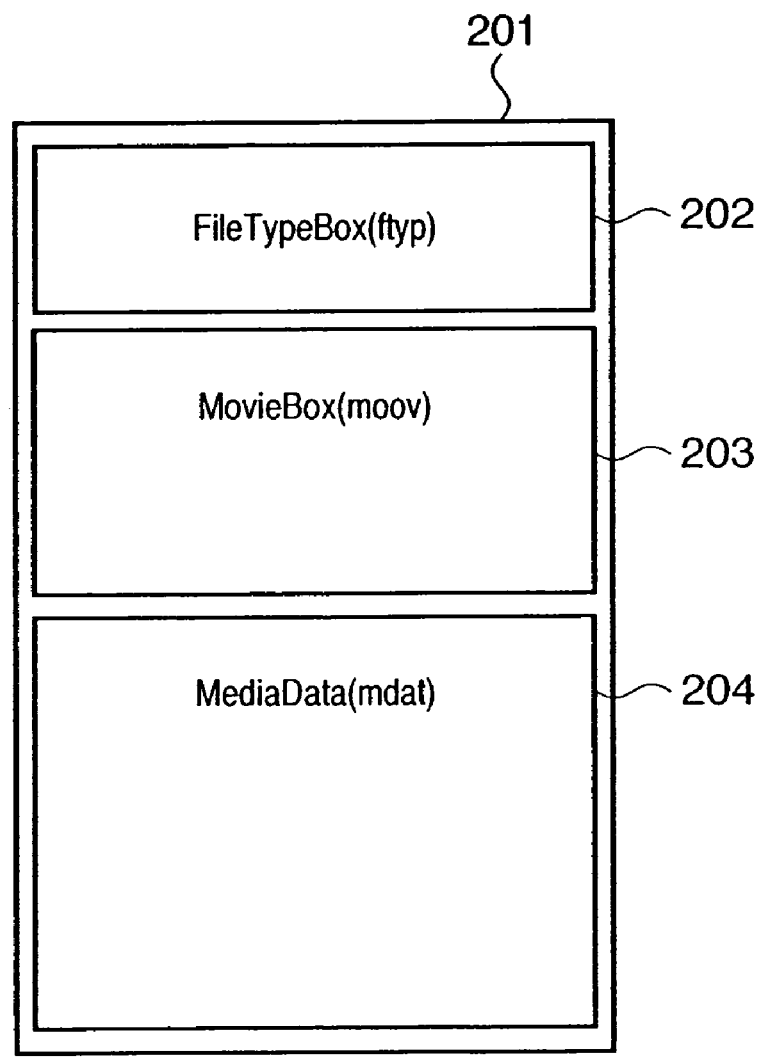
FIG. 2 is a block diagram showing one example of the structure of the conventional MP4 file.
Figure 3:
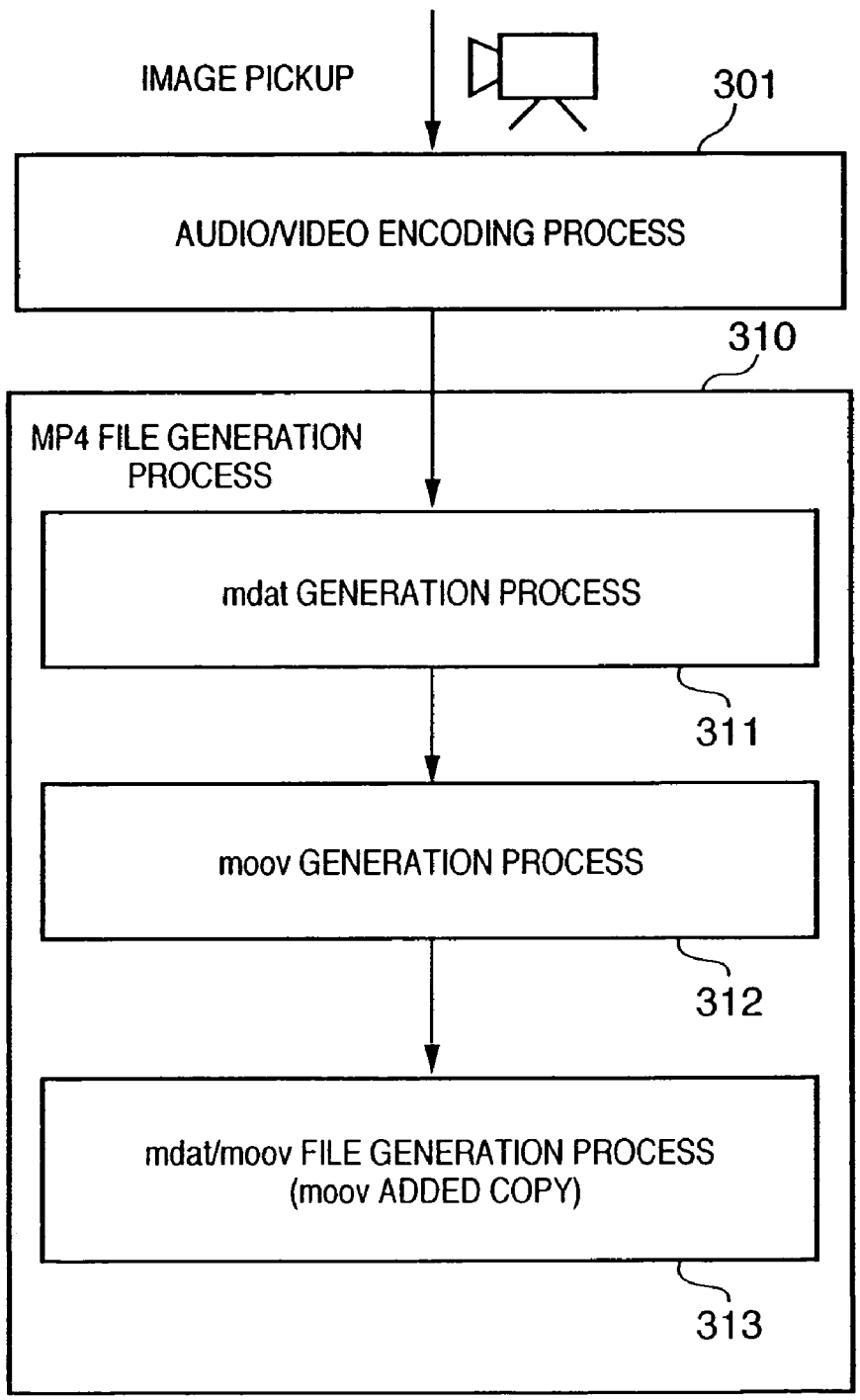
FIG. 3 is a block diagram showing the structure of a process up to the generation of the conventional MP4 file.
Figure 4:
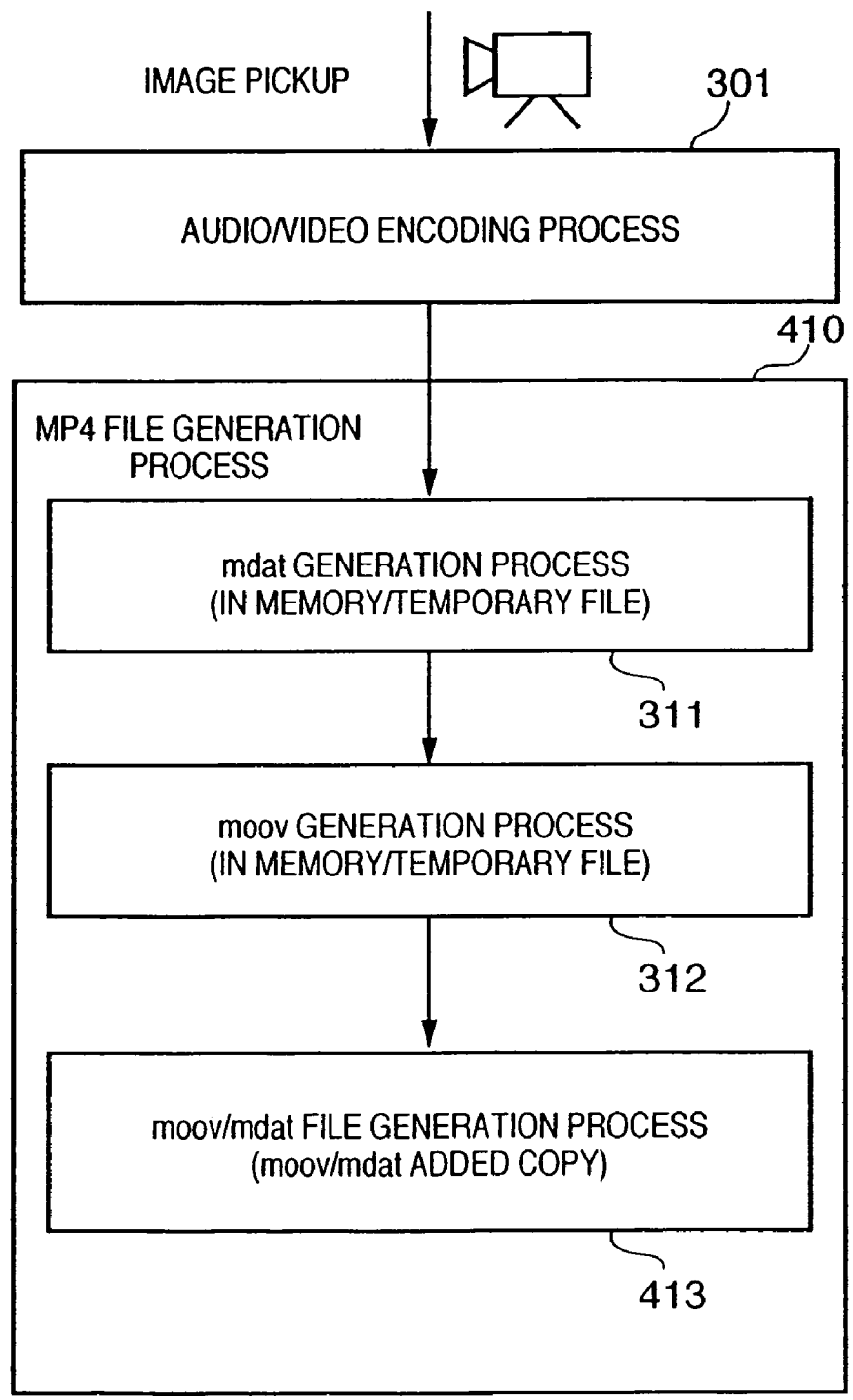
FIG. 4 is a block diagram showing the structure of another process up to the generation of the conventional MP4 file.
Figure 5:
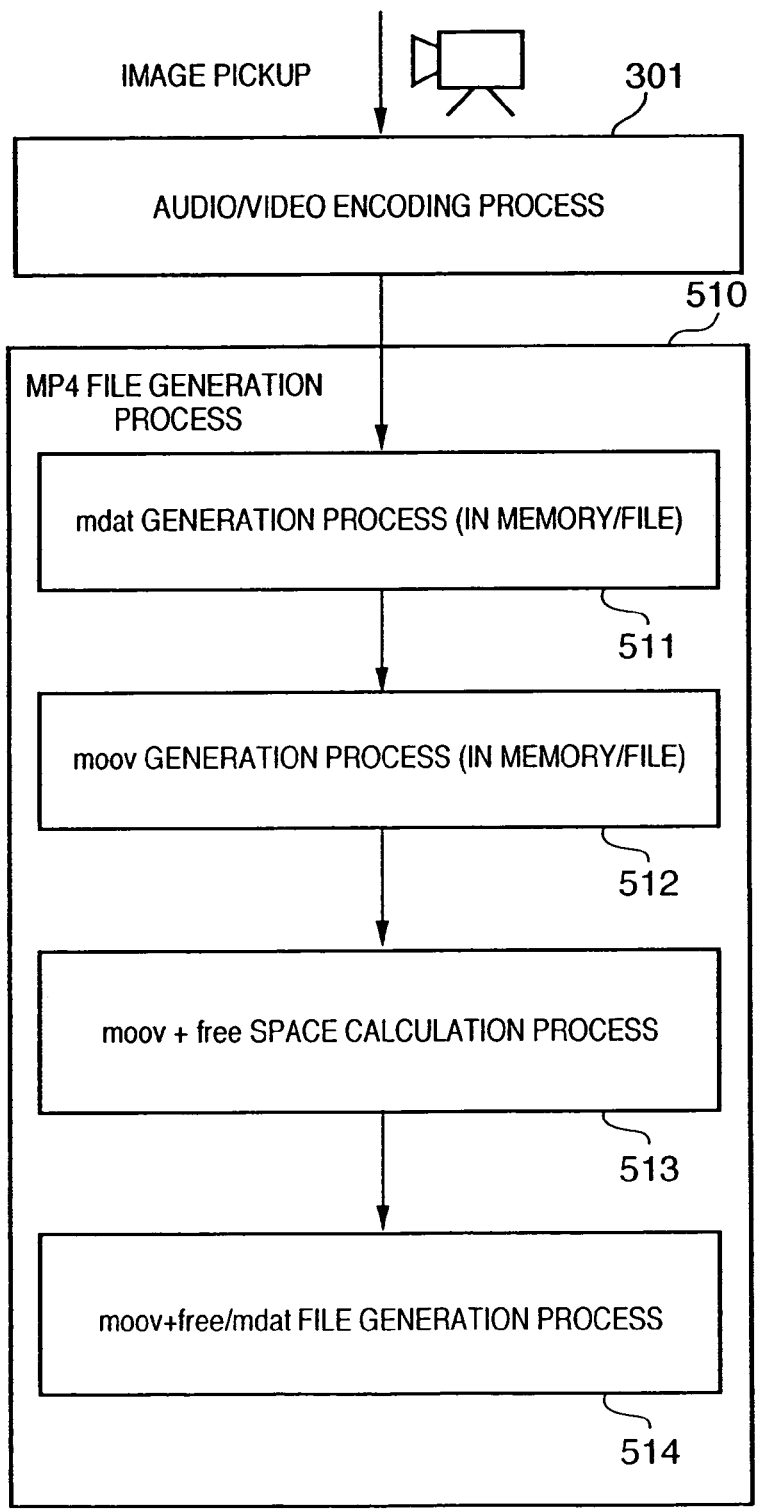
FIG. 5 is a block diagram showing the structure of another process up to the generation of the conventional MP4 file.

Thus, as described above, in the moov/mdat file generation process 413 shown in FIG. 4, the process of copying from the mdat memory or temporary file to the MP4 file becomes unnecessary, and the time required to create an MP4 file in which the moov is placed before the mdat is shortened.

If by chance the actual moov data is larger than the empty space reserved by the initial calculation, then the file generated initially is treated as an intermediate file and the file moov empty space is recalculated so that a new file moov empty space is produced that is larger than the space calculated initially. Then, a new file is generated with the new moov space reserved at the head of the file. Then, from behind the new file moov space, the mdat portion already present in the intermediate file is copied. After the moov is revised by repositioning the mdat, continuations of the mdat are further added to the very end of the file and written to the file. This process is repeated to generate the final MP4 file.

(Structure of the File Generating Apparatus)

Figure 13:
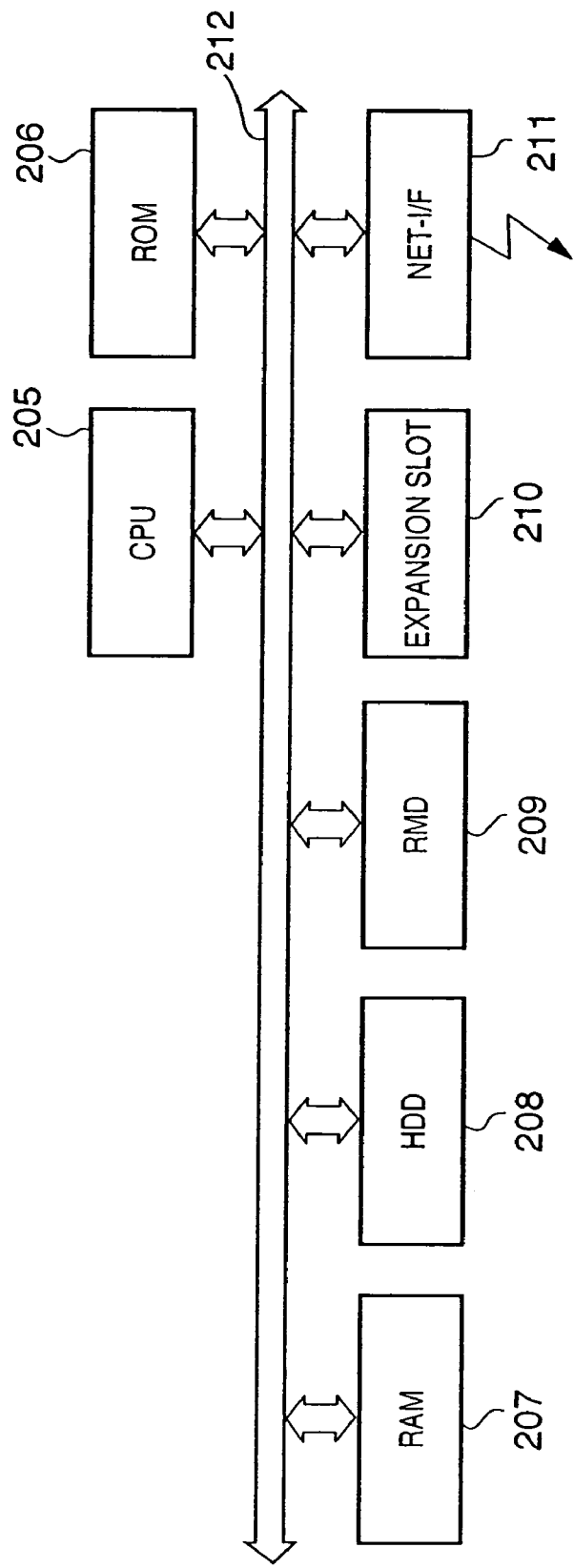
FIG. 13 is a block diagram showing an example of the configuration of a file generating apparatus that is capable of implementing the file creation method of the embodiments of the present invention.

FIG. 13 is a block diagram showing an example of the configuration of a file generating apparatus that is capable of implementing the file creation method of the above-described embodiment of the present invention.

In the diagram, a CPU 205, a ROM 206, a HDD 208 and so forth execute a record control program and control each part of the apparatus, to exert overall control of the file generating apparatus.

The ROM (Read Only Memory) 206 stores the programs and the parameters that the CPU 205 executes. A RAM (Random Access Memory) 207 is used as a work area when the CPU 205 executes, as a temporary shelter area during error processing, and so forth.

The hard disk drive (HDD) 208 and the removable media drive (RMD) 209 function as external storage devices. The removable media drive (RMD) 209 is a device that reads to and writes from, or simply reads from, a removable storage medium, and may be a flexible disk drive, an optical disk drive, a magneto-optic disk drive, a memory card reader, or the like, as well as a removable HDD.

It should be noted that the application programs and the error processing program as well as the programs, OS, application programs, data, libraries and so forth that implement the MP4 file generation process described in the present embodiment are stored in one or more of the ROM 206, the HDD 208, the RMD 209 (storage media).

An expansion slot 210 is an expansion card slot that conforms to, for example, the PCI (Peripheral Component Interconnect) bus specification, and can accommodate a variety of expansion boards including a video capture board.

A network interface 211 is an interface for connecting the file generating apparatus to a computer network. A bus 212 is composed of an address bus, a data bus and a control bus, and connects the units described above. In addition to the network interface 211, the file generating apparatus has a serial interface such as an RS-232C, an RS-422, a USB (Universal Serial Bus) or an IEEE 1394, as well as a parallel interface such as an IEEE 1284, in order to be able to effect connections with external devices.

In such a file generating apparatus, the audio/video encoding process 301 may be carried out by an external device, by a video capture board inserted into the expansion slot 210, or by a software encoder implemented by the CPU executing an encoding program. If the encoding process is carried out by an external device, the audio/video to be encoded is acquired from the various interfaces and the RMD media.

It should be noted that the above-described file generating apparatus can be implemented by an ordinary computer as well as by a configuration included in an image pickup apparatus, such as a digital video camera or a digital camera, or a mobile data terminal, such as a mobile-phone or a PDA. In other words, the file generating method can be implemented using such an image pickup apparatus or mobile data terminal without the need to add special configurations.

(Details of the MP4 File Generation Process)

Figure 8:
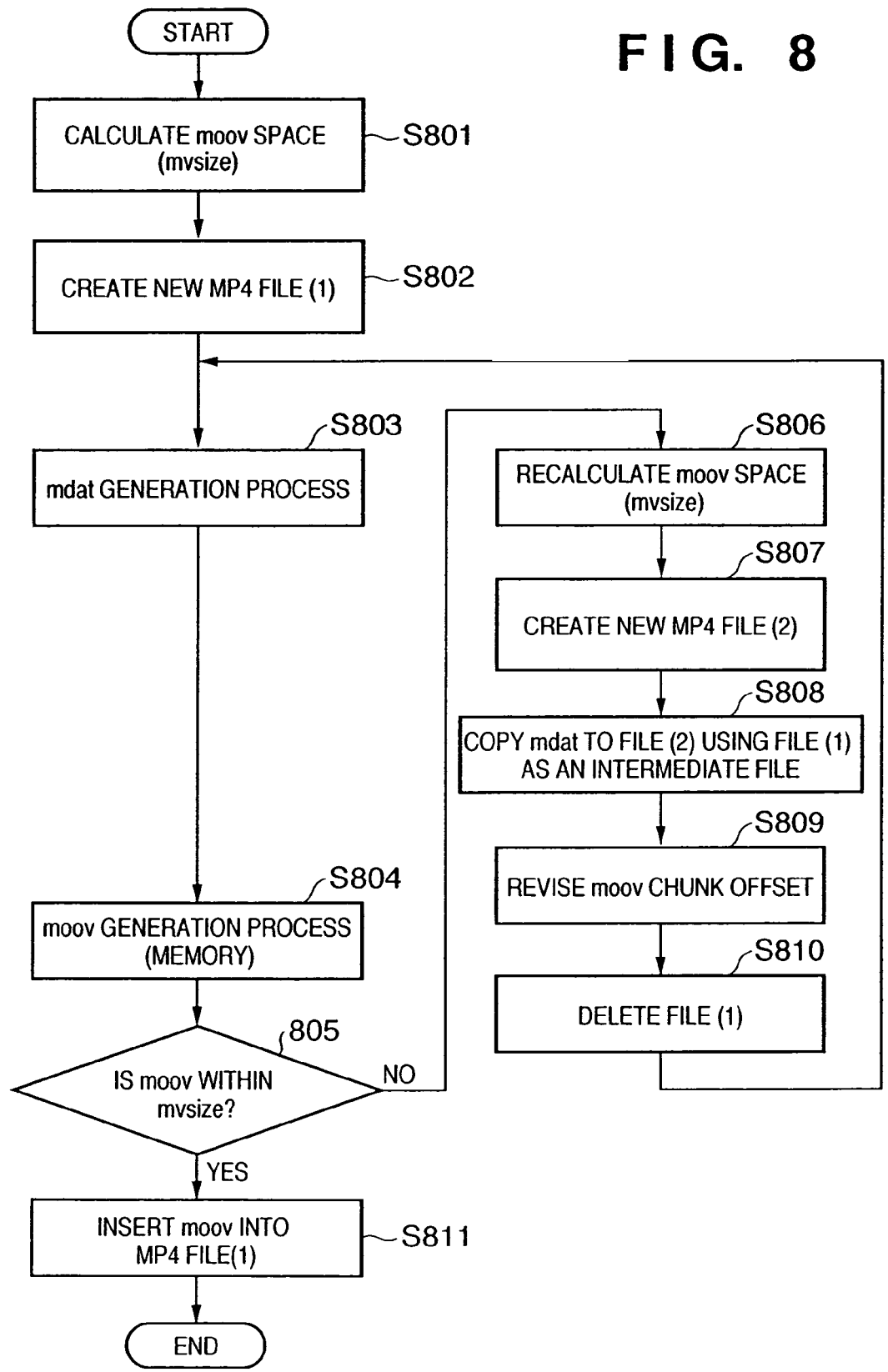
FIG. 8 is a flow chart showing details of an MP4 file generation process according to the first embodiment of the present invention of the present invention.

A more detailed description of the MP4 file generation process according to the present embodiment is given below, using the flow chart shown in FIG. 8.

First, in S801, the size of the space thought to be necessary for the moov space (the moov size, hereinafter "mvsize") is calculated. A detailed description of the method used to calculate this moov space is given later. The mvsize is also stored in a memory (for example, the RAM 207).

In S802, a new MP4 file (1) is created and the file write start position is moved at the head of the file by an address that corresponds to the mvsize calculated in S801. In S803, encoded data acquired from, for example, a hardware encoder connected to the expansion slot 210 is written after the mvsize as mdat. Then, in S804, a moov is generated in the memory from the information of this mdat.

In S805, the size of the actual moov generated in S804 and the estimated size mvsize stored in the memory are compared. If the actual moov size exceeds the mvsize, the moov space is recalculated in S806. As with the method used to calculate the mvsize in S801, a detailed description of the method used to recalculate the moov space is given later, but it can be noted here that the recalculation produces a larger mvsize. Then, the re-estimated size calculated in S806 is stored in the memory as a new mvsize.

In S807, a new MP4 file (2) is created. In the new MP4 file (2) as well, as with the MP4 file (1) generated in step S802, the file write start position is advanced by the mvsize obtained by the recalculation carried out in S806. Next, in step S808, using the MP4 file (1) as an intermediate file, the mdat already written in the MP4 file (1) is copied (written) to the new MP4 file (2).

Furthermore, in S809, the moov in the memory generated in S804 is also revised (chunk offset revision) based on the mdat repositioned in the MP4 file (2). Once the copying of mdat from the intermediate file to the new MP4 file is completed, in S810 the MP4 file used as the intermediate file is deleted. The new MP4 file (2) is then made the MP4 file (1) and the process returns to S803.

Thereafter, with the new MP4 file (1), the process from S803, that is, from the generation of mdat following the mdat copied from the intermediate file to the generation of moov based on mdat thus generated and the comparison of the actual moov size and the estimated mvsize, is repeated. Ultimately, when the mdat generation process and the moov generation process are completed for all the encoded data that is acquired, and moreover the moov actual size is reduced to the mvsize through the comparison carried out in S805, in the process of S811 the moov in the memory is inserted in the empty space reserved at the head of the MP4 file (1) and the file generation process is ended.

Figure 10:
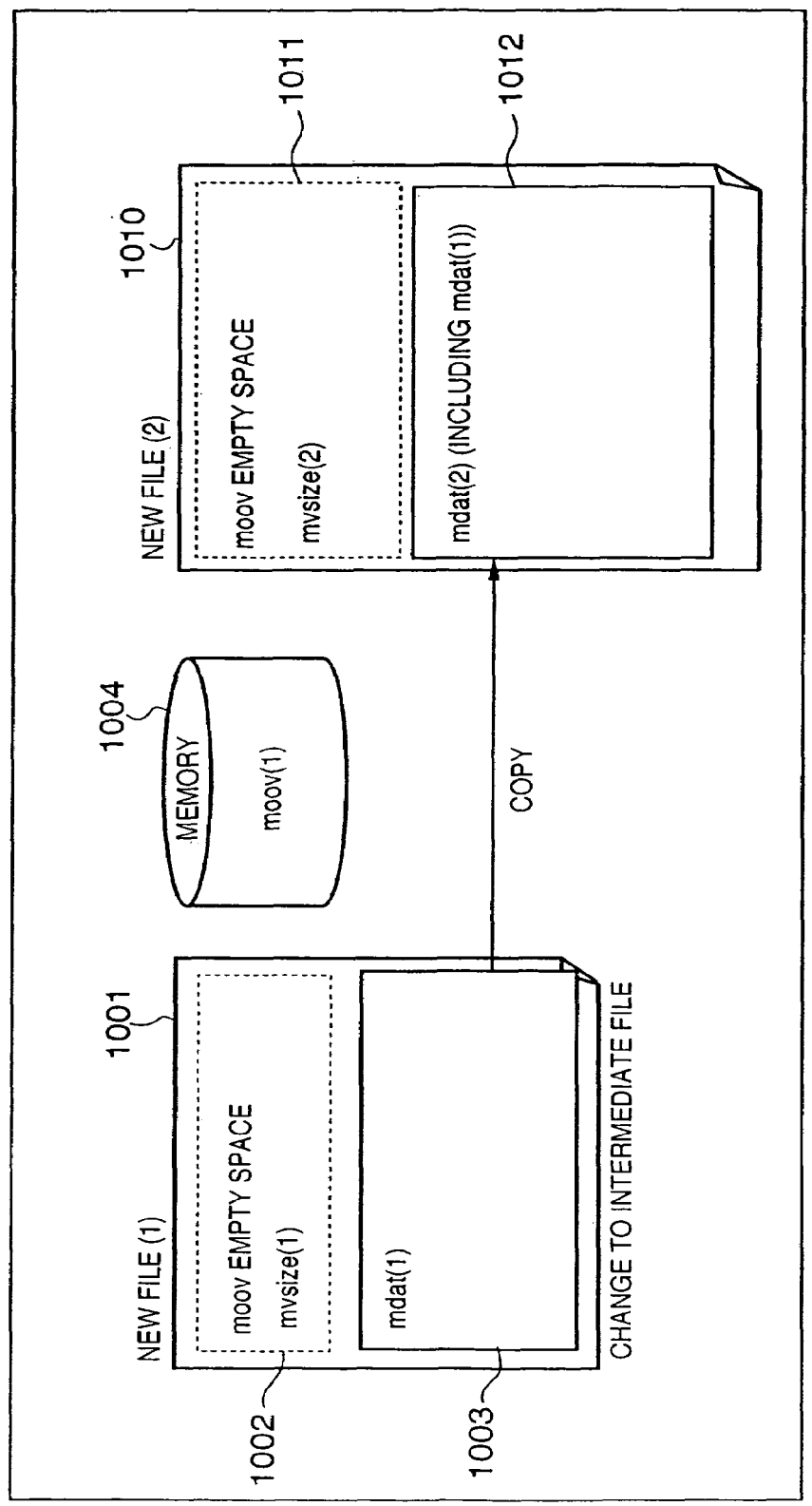
FIG. 10 is a schematic diagram showing a case in which an intermediate file generated during MP4 file generation according to the first embodiment of the present invention.

FIG. 10 is a schematic-diagram of the process performed in the present embodiment. The processes of S801-S806, S811 shown in FIG. 8 are performed on the new file (1) 1001 shown at the left. In S806, if the 1002 mvsize (1) exceeds the actual moov (1) 1004 size in the memory, a new file (2) 1010 shown at the right in FIG. 10 is generated. Then, using the new file (1) 1001 as an intermediate file, the mdat 1003 portion is copied to the new file (2) space 1012. At the same time, the moov 1004 in the memory is revised and the new file (1) 1001 is deleted. This process is repeated until mdat and moov generation for the acquired encoded data is completed.

(moov Size Calculation Method)

A description is now given of the method of calculating the estimated moov size mvsize carried out in S801 and S806.

Figure 6:
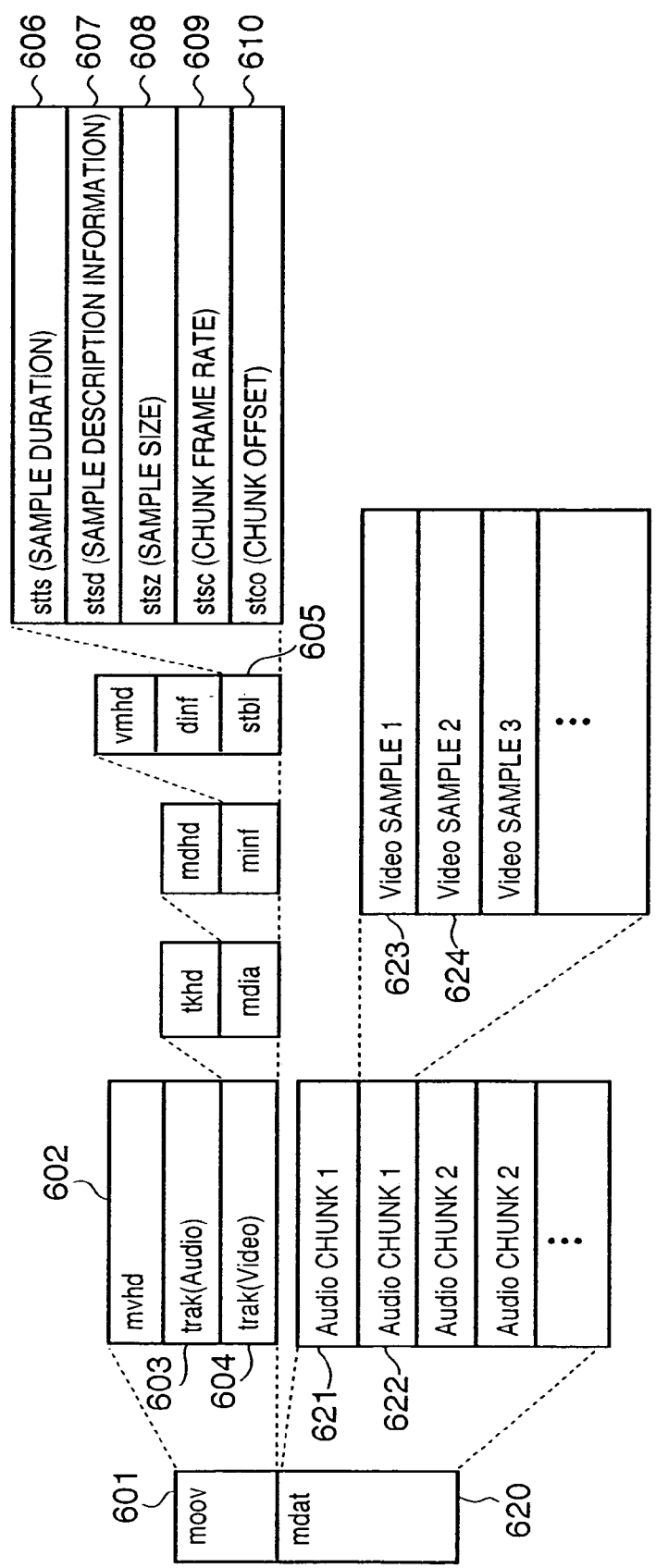
FIG. 6 is a block diagram showing the structure of moov, mdat of the conventional MP4 file.

Reference numeral 1201 shown in FIG. 12 indicates a sample formula. Basically, the MP4 file moov size is composed of a fixed data size portion and a variable data size portion. The fixed data size portion is a header type size, details of which can be seen in FIG. 6 or in the relevant ISO standards (specifically ISO/IEC 14496-14). The fixed data size portion used in the formula indicated by reference numeral 1201 consists of several hundreds bytes composed of the sum of the sizes of Boxes including a mvhd (movie header) part and other, optional Boxes such as an iod (initial object descriptor), for example, and several hundred bytes composed of the sum of a tkhd (track header) part and other media headers, multiplied by the number of tracks t.

The variable data size portion varies depending on such factors as the frame rate of the moving picture that is picked up (that is, the sample rate) and the length of image pickup time. The variable data size in the formula indicated by reference numeral 1201 is the sum of the respective functions of the stts, stss, stsz, ctts, stco that are Boxes in the moov, multiplied by the number of tracks t, that is:

(Fstts+Fstss+Fstsz+Fctts+Fstco)×t.

That which is written as Fxxxx expresses a function for the purpose of calculating the maximum required size of the Box that accepts the greatest variation in size due to the frame rate and the length of image pickup time. For example, Fstts is the maximum required size function in the stts Box. The sum of the foregoing fixed data size and variable data size is the mvsize.

Next, a detailed description is given of the functions of the five Boxes of the variable data size portion, using Fstts as an example. The stts Box maintains a combination of the entry count (4 bytes), the sample count (4 bytes) and the sample delta (4 bytes) as the entry count part. The duration of the sample is stored in the sample delta and a continuous number of samples of that duration is stored in the sample count. Then, the number of entries in the continuous sample that is the combination of that sample count and delta is stored in the entry count.

From this, it can be deduced that at a minimum there is one sample combination, with a minimum required size of 4+4+4=12. In addition, since the maximum number of sample combinations is the total number of samples, if the total number of samples is n, then 4+(4+4)×n=8n+4. Furthermore, the stts Box is a FullBox as described in the section on the background art above, ad in addition to size and type requires version and flag fields, which necessitates a further 12 bytes to the formula described above. Consequently, by adding 12 to the formula 8n+4 that obtains the maximum required size results in Fstts=8n+4+12=8n+16.

The foregoing describes in detail the functions/variables of that which is indicated by reference numeral 1202 in FIG. 12, and furthermore, from the fact that the total number of frames n at the bottom is obtained by multiplying the frame rate (fps) f by the length of image pickup time (sec) x, Fstts=8n+16=8fx+16.

Similarly, the results obtained for Fstss, Fstsz, Fctts, Fstco are also shown in 1202.

Although values are obtained using the calculation formula for mvsize described above, of the parameters that determine the variable data size the numbers for the number of tracks t and the frame rate f are determined in advance. However, the length of image pickup time (the duration of the moving picture) x is an assumed value. By setting the image pickup time x to a small value, from past data and the like, the mvsize is calculated in S801. Alternatively, the mvsize image pickup time x may be set to an initial value determined in advance, or to a value that is sufficiently small. In addition, where it is necessary to perform a recalculation in S806, that recalculation can be carried out with a value greater than the x set in S801, for example a multiple of x, and if the mvsize obtained as a result increases, the value for x used in the calculations performed in S806 can be determined using another arbitrary method.

Thus, as described above, the present embodiment makes it possible to generate a relatively compact MP4 file with the moov at the head of the file with little memory capacity, and moreover, because the size of the mdat that must be copied is usually smaller than conventionally, the time required to generate the file can be shortened.

SECOND EMBODIMENT

In the first embodiment, if the actual size of the moov ultimately fits into the mvsize, then the file generation process is completed without regard to the size of the difference between the actual size and mvsize, that is, the size of the space that is reserved but not used.

By contrast, the present embodiment from the start reserves not a small moov space but a rather large moov space. Then, if the size of the moov ultimately exceeds a preset threshold, the process of writing the moov to the file at the head of the file is terminated. On the other hand, if the size of the moov does not exceed the threshold, then it is determined that the wasted empty capacity is great and a new file is created with the actual moov size space reserved at the head of the file, thereby accomplishing the deletion of the empty capacity. This type of file generating method is appropriate when a comparatively large MP4 file is expected to be generated or when it is necessary to generate such a file.

Figure 9:
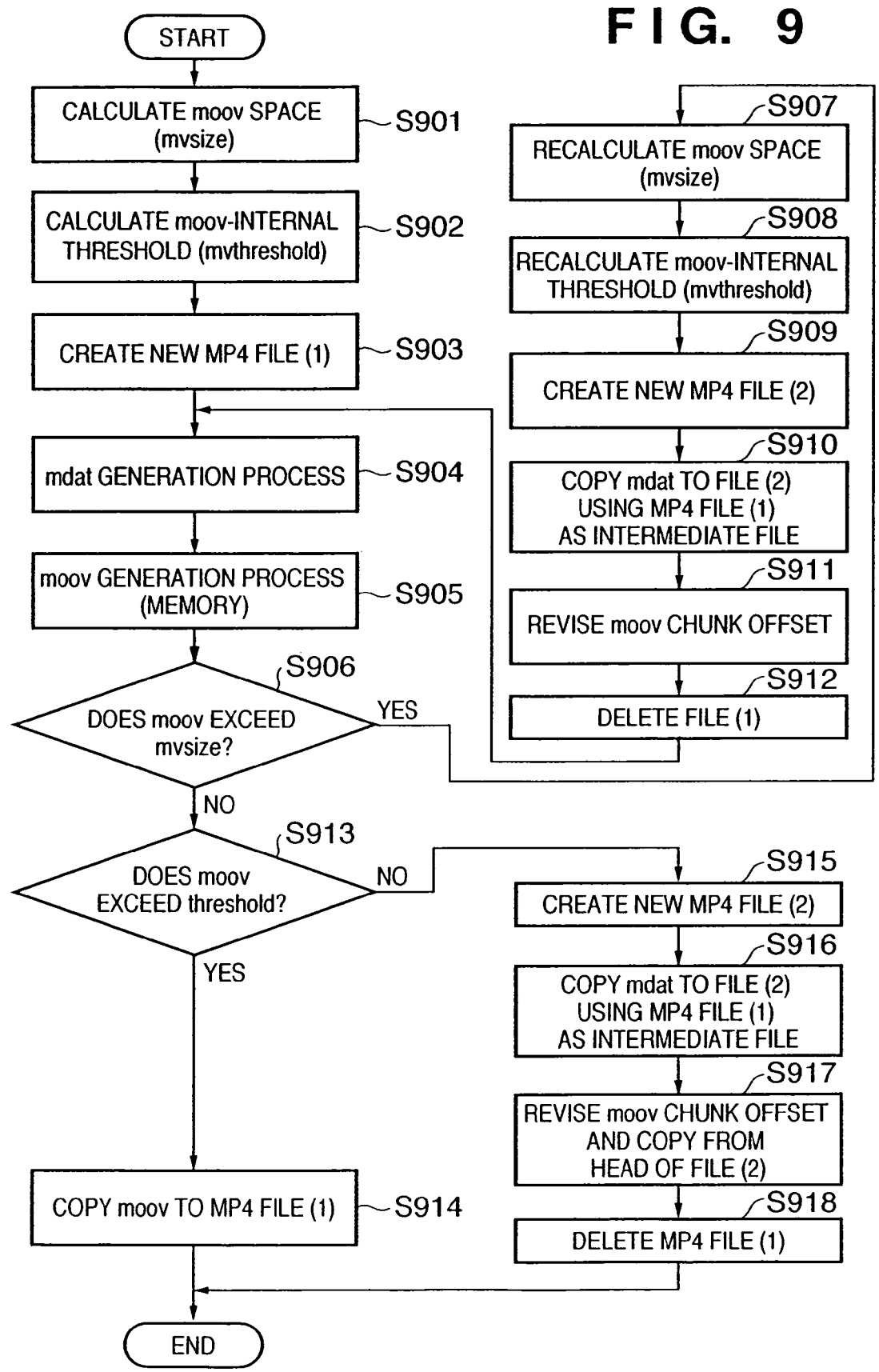
FIG. 9 is a flow chart showing details of an MP4 file generation process according to a second embodiment of the present invention of the present invention.

FIG. 9 is a flow chart illustrating the MP4 file generation process of the present embodiment.

In S901, the estimated moov space size (called mvsize hereinafter as well) is calculated, by a calculation method to be described later. Next, in S902, a threshold (hereinafter "mvthreshold") that is a use limit for writing the actual moov in the mvsize space calculated in S901 is calculated, also by a calculation method to be described later. Thereafter, in S903, a new MP4 file is generated and the write start position is advanced by an amount equivalent to the mvsize calculated in S901.

In S904, mdat generation is commenced and data is written from the designated write start position of the MP4 file (1). In S905, the moov is then generated from that mdat. Here, the description is of a case in which the moov is written to a memory. Thereafter, in S906, the actual moov size in the memory and the mvsize calculated in S901 are compared. If the moov size exceeds the mvsize, then in S907 the mvsize is recalculated. This recalculation method also is described later. It should be noted that, if unprocessed data remains in the encoded data that is acquired, the process of generating mdat and the process of generating moov in S904 and S905 continue even if the moov is smaller than the mvsize.

The mvsize obtained by the recalculation in S907 is stored as the new mvsize. At the same time, in S908, the mvthreshold, which is a new threshold in the moov space, is recalculated as well. This recalculation method also is described later. Thereafter, in S909, a new MP4 file (2) is created, and the write start position is advanced by an amount equal to the new mvsize calculated in S907.

In S910, the MP4 file (1) is used as an intermediate file and the mdat is copied to the MP4 file (2) from the write start position. Also, in S911, the moov in the memory is revised by copying/rearranging the mdat, and the MP4 file (1) used as an intermediate file is deleted in S912. Then, by replacing MP4 file (1) with the new MP4 file (2), the mdat that continues to be generated in S904 is written behind the copied mdat and in S905 the moov generation process is carried out.

After mdat generation and moov generation have been carried out for all the acquired encoded data, in S906, if the actual moov size in the memory is equal to or smaller than the mvsize calculated in S901 or S907, then processing proceeds to S913. In S913, the actual moov size and the mvthreshold calculated in S902 or S908 are compared.

If the actual moov size exceeds the mvthreshold, then in S914 the moov generated in the memory is written to the MP4 file at the head of the file, and the file generation process is terminated. On the other hand, if in S913 the actual moov size is equal to or less than the mvthreshold, then a new MP4 file (2) is created in order to delete the moov portion empty space in S915. In S914, a portion equal to the actual moov size in the memory is reserved in the new MP4 file (2), and in S916 the mdat portion is copied behind that reserved space using the MP4 file (1) as an intermediate file. Thereafter, in S917, after the moov portion has been revised by changing the position of the mdat, the moov is written to the new MP4 file (2) at the head of the file. In S918, the MP4 file (1) used as an intermediate file is deleted.

Figure 11:
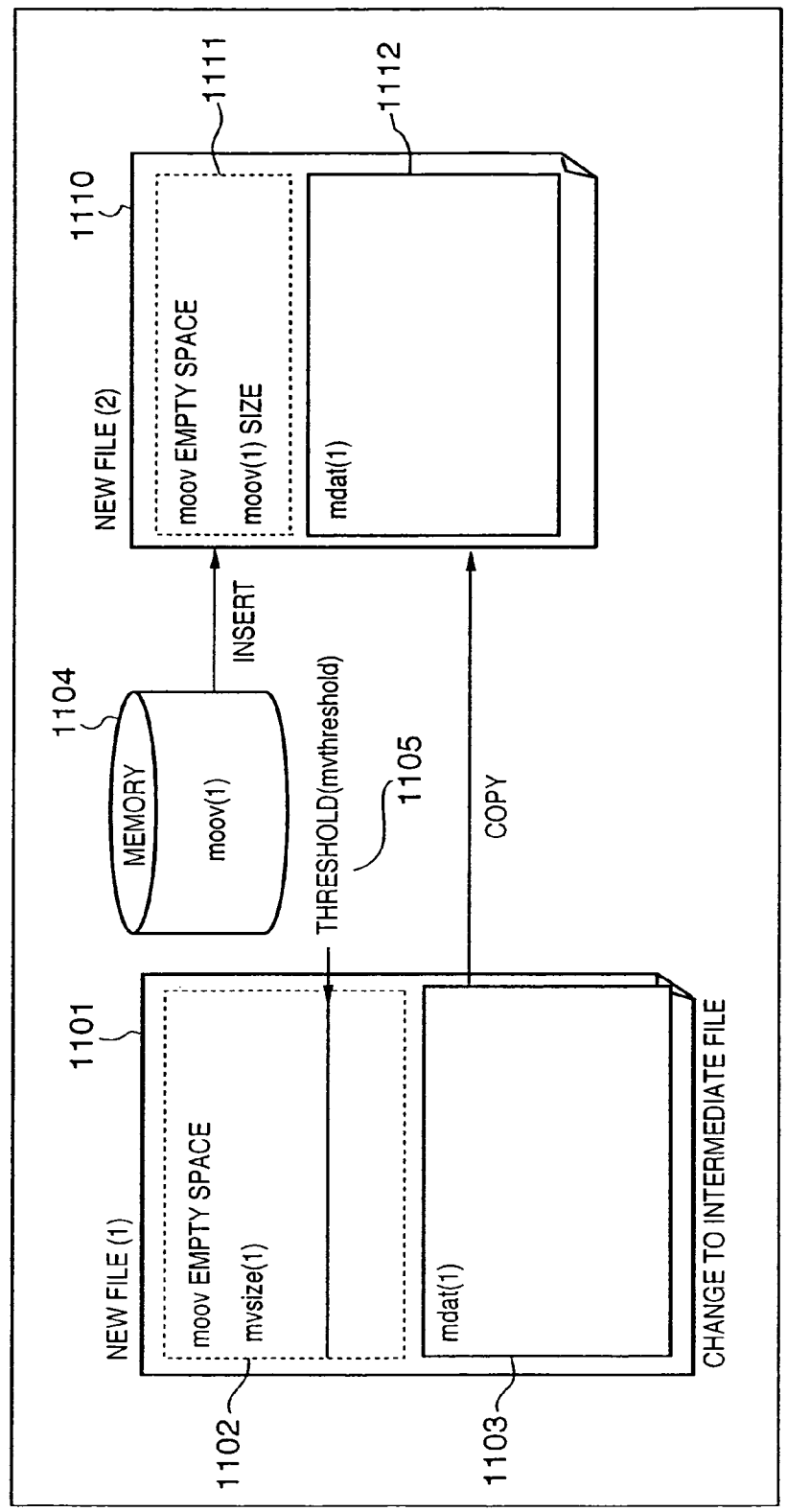
FIG. 11 is a schematic diagram showing a case in which an intermediate file is generated during MP4 file generation according to the second embodiment of the present invention.

FIG. 11 is a schematic diagram of the processing performed by the present embodiment. In a new file (1) 1101 shown at the left, the processes of S901-S906, S913 and S914 shown in FIG. 9 are carried out. In S913, if the actual moov 1104 size in the memory does not exceed 1105 mvthreshold, then a new file (2) 1110 shown at the right is generated. The new file (1) 1101 is then used as an intermediate file, and an mdat portion 1103 is copied to a space 1112 in the new file (2). At the same time, the moov 1104 in the memory is revised and copied to the space 1111 reserved at the head of the new file (2). When these processes are completed the file (1) is deleted.

(Methods for Calculating mvsize, mvthreshold)

A description is now given of the method of calculating the mvsize in S901 and S907 shown in FIG. 9. Here, too, it is possible to utilize the equations shown in FIG. 12 described in the first embodiment. Details are as per the first embodiment. In addition, as with the first embodiment, although values for the number of tracks t and the frame rate f are fixed, an assumed value is used for the image pick-up time x. However, the present embodiment differs from the first embodiment in that the mvsize is calculated by setting the x larger in relation to past data and the like.

In addition, the mvthreshold calculated in S902, S908 is a value that is smaller than the mvsize. As a result, as with the mvsize, the equations of FIG. 12 can be used, and it is possible to calculate the mvthreshold using an x' that is smaller than the length of image pickup time x used in the mvsize calculation of S901, S907. In addition, apart from the equations shown in FIG. 12, it is also possible to calculate the mvthreshold by multiplying the mvsize by a constant that is less than 1, for example ⅔.

Furthermore, in the mvsize recalculation of S907, it is possible to calculate the mvsize using the equations shown in FIG. 12 by using a value that exceeds the length of image pickup time x used in the calculations performed in S901, for example, a value that is a multiple of x. Similarly, in the recalculation of the mvthreshold in S908 as well, it is also possible to use a value x' that is less than the x set in S907 and apply it to the equations shown in FIG. 12, and it is also possible to calculate the mvthreshold by multiplying the mvsize calculated in S908 by a constant.

Thus, as described above, the present embodiment applies a threshold to the space reserved for the moov, and if the actual moov size is at or below that threshold, re-reserves the moov space to the actual size. As a result, in addition to the benefits, provided by the first embodiment, this embodiment further reduces the size of the empty space that can arise in the moov area and enables generation of a compact MP4 file.

THIRD EMBODIMENT

The MP4 file generating methods described in the aforementioned first embodiment and second embodiment are not exclusive, and can be switched and implemented according to arbitrary conditions. Specifically, each of these techniques can be defined as different modes or options of the device that generates the MP4 file, with the user or the image pickup apparatus, mobile-phone, PDA or other device able to set the mode or option at will.

OTHER EMBODIMENTS

The foregoing describes the present invention in terms of preferred embodiment thereof. However, these embodiments are merely illustrative of the invention, and do not limit the invention in any way. For example, the files generated by the invention are not limited to the MP4 files, and the invention can be adapted to the creation of any other type of file of a structure having metadata information such as moov and data information such as mdat.

In addition, the invention also includes a case in which the same functions as those of the present invention are achieved by supplying a software program that implements the functions of the foregoing embodiments directly or indirectly, or by using wire/wireless communications, to a system or apparatus having a computer capable of executing the program, with the computer of the system or apparatus then executing the program thus supplied.

Accordingly, since a computer implements the processing functions of the present invention, the program code supplied to and installed in the computer itself also achieves the present invention. In other words, the computer program for implementing the functional processes of the invention is itself also within the scope of the present invention.

In that case, so long as the system or apparatus has the functions of the program, the program may be executed in any form, such as an object code, a program executed by an interpreter, or scrip data supplied to an operating system.

Examples of storage media that can be used for supplying the program are magnetic storage media such as a floppy disk, a hard disk, or magnetic tape, optical/magneto-optical storage media such as an MO, a CD-ROM, a CD-R, a CD-RW, a DVD-ROM, a DVD-R, or a DVD-RW, and a non-volatile semiconductor memory or the like.

As for the method of supplying the program using wire/wireless communications, there is, for example, a method in which a data file (program data file), either a computer program itself that forms the invention or a file or the like that is compressed and automatically installed, and capable of becoming the computer program that comprises the invention on a client computer, is stored on a server on a computer network, and the program data file is downloaded to a connected client computer. In this case, the program data file may be divided into a plurality of segment files and the segment files distributed among different servers.

In other words, a server device that downloads, to multiple users, the program data files for implementing the functional processes of the present invention by computer, is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases in which the aforementioned functions according to the embodiments are implemented by a computer executing the read program, an operating system or the like running on the computer may perform all or a part of the actual processing based on the instructions of that program, so that the functions of the foregoing embodiments can be implemented by this processing.

Furthermore, after the program read from the storage medium is written to a function expansion board inserted in the computer or to a memory provided in a function expansion unit connected to the computer, a CPU or the like mounted on the function expansion board or function expansion unit may perform all or a part of the actual processing, so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Applications No. 2004-254680 filed on Sep. 1, 2004, which is hereby incorporated by reference herein.

What is claimed is:

1. A file generating method for generating a file that contains encoded data and management information that manages the encoded data, comprising:

a first calculating step of calculating, based on a function of a frame rate and a length of image pickup time of the encoded data being recorded in a predetermined format, a variable data size portion of a capacity thought to be required for recording the management information;

a second calculating step of calculating a management information capacity thought to be required for recording the management information based on a fixed data size portion of the capacity and the variable data size portion of the capacity calculated in the first calculating step;

a file generating step of generating a new file that reserves a space that is equivalent to the management information capacity calculated in the second calculating step at the head of the file;

an encoded data recording step of recording encoded data after the space that is equivalent to the management information capacity in the new file in the predetermined format;

a management information generating step of generating management information based on the encoded data that is recorded in the encoded data recording step;

a comparing step of comparing the management information capacity and an actual capacity of the management information that is generated in the management information generating step;

a control step of executing the encoded data recording step, the management information generating step and the comparing step on encoded data targeted for recording, wherein if it is detected in the comparing step that the management information capacity is smaller than the actual capacity, said control step resets the management information capacity to a greater value by re-executing the first and second calculating steps and generates a new file in the file generating step based on the revised management information capacity, and generates the file by writing the management information generated in the management information generating step in the space that is equivalent to the management information capacity; and a copying step of copying the encoded data that is already written in a previously generated file to the new file after a new file is generated in the file generating step if it is detected in the comparing step that the management capacity is smaller than the actual capacity.

2. The file generating method according to claim 1, further comprising a deletion step of deleting the previously generated file when copying is finished.

3. The file generating method according to claim 1, wherein before the control step writes the management information generated in the management information generating step in the space that is equivalent to the management information capacity, the control step compares a predetermined capacity that is smaller than the management information capacity and the actual capacity of the management information and writes the management information in the space that is equivalent to the management information capacity only if the actual capacity exceeds the predetermined capacity.

4. The file generating method according to claim 3, wherein, if the actual capacity is equal to or less than the predetermined capacity, the control step causes a new file to be generated in the file generating step with a space that is equivalent to the actual capacity as the management information capacity, copies encoded data recorded in an already generated file to the new file, and writes the management information in the space that is equivalent to the management information capacity of the new file.

5. The file generating method according to claim 3, wherein the predetermined capacity is revised to a larger value depending on revision of the management information capacity.

6. A computer-readable recording medium storing a program for causing a computer to execute the file generating method according to claim 1.

7. A file-generating apparatus comprising a processor adapted to execute the file generating method according to claim 1 and record a moving picture file.

8. A file generating apparatus for generating a file that contains encoded data and management information that manages the encoded data, comprising a processor, said processor including:

first calculating means adapted to calculate, based on a function of a frame rate and a length of image pickup time of the encoded data being recorded in a predetermined format, a variable data size portion of a capacity thought to be required for recording the management information;

second calculating means adapted to calculate a management information capacity thought to be required for recording the management information based on a fixed data size portion of the capacity and the variable data size portion of the capacity calculated by the first calculating means;

file generating means adapted to generate a new file that reserves a space that is equivalent to the management information capacity calculated by said second calculating means at the head of the file;

encoded data recording means adapted to record encoded data after the space that is equivalent to the management information capacity in the new file in the predetermined format;

management information generating means adapted to generate management information based on the encoded data that is recorded by said encoded data recording means;

comparing means adapted to compare the management information capacity and an actual capacity of the management information that is generated by the management information generating means;

control means adapted to cause the encoded data recording means, the management information generating means and the comparing means to execute processing of encoded data targeted for recording, wherein, if it is detected by the comparing means that the management information capacity is smaller than the actual capacity, said control means causes the calculating means to reset the management information capacity to a greater value and causes the file generating means to generate a new file based on the revised management information capacity, and generates the file by writing the management information generate by the management information generating means in the space that is equivalent to the management information capacity; and copying means adapted to copy the encoded data already written in an already generated file to a new file after it is detected by the comparing means that the management information capacity is smaller than the actual capacity and the new file is generated by the file generating means.

9. The file generating apparatus according to claim 8, further comprising deletion means adapted to delete the previously generated file when copying is finished.

10. The file generating apparatus according to claim 8, wherein before the control means writes the management information generated by the management information generating means in the space that is equivalent to the management information capacity, the control means compares a predetermined capacity that is smaller than the management information capacity and the actual capacity of the management information and writes the management information in the space that is equivalent to the management information capacity only if the actual capacity exceeds the predetermined capacity.

11. The file generating apparatus according to claim 10, wherein, if the actual capacity is equal to or less than the predetermined capacity, the control means causes the file generating means to generate a new file with a space that is equivalent to the actual capacity as the management information capacity, copies encoded data recorded in an already generated file to the new file, and writes the management information in the space that is equivalent to the management information capacity of the new file.

12. The file generating apparatus according to claim 11, wherein the predetermined capacity is revised to a larger value depending on revision of the management information capacity.

* * * * *